United States Patent [19]

Cary

[11] 4,119,394

[45] Oct. 10, 1978

[54] APPARATUS FOR FORMING AN END FINISH ON A HOLLOW ARTICLE

[75] Inventor: John T. Cary, Naperville, Ill.

[73] Assignee: The Continental Group, Inc., New York, N.Y.

[21] Appl. No.: 782,273

[22] Filed: Mar. 28, 1977

[51] Int. Cl.$^2$ .......................................... B29D 23/03
[52] U.S. Cl. .................................. 425/390; 425/525; 425/389; 249/59
[58] Field of Search ............... 425/389, 390, 525, 535; 264/93, 314

[56] References Cited

U.S. PATENT DOCUMENTS

| 3,032,823 | 5/1962 | Sherman | 425/389 X |
| 3,457,592 | 7/1969 | Winchester, Jr. | 425/525 |
| 3,769,394 | 10/1973 | Latreille | 425/525 X |
| 3,817,678 | 6/1974 | Armour | 425/525 |
| 3,955,908 | 5/1976 | Farrell | 425/390 |
| 3,969,060 | 7/1976 | Rosenkranz et al. | 425/535 X |
| 3,981,668 | 9/1976 | Farrell | 425/389 X |
| 4,009,982 | 3/1977 | Maier | 425/389 |

FOREIGN PATENT DOCUMENTS 2,154,777  5/1973  Fed. Rep. of Germany .......... 425/389

Primary Examiner—Francis S. Husar
Assistant Examiner—William R. Briggs
Attorney, Agent, or Firm—H. Lawrence Smith; Joseph E. Kerwin; William A. Dittmann

[57] ABSTRACT

Apparatus for forming an end finish on a hollow article having a plastically deformable tubular end portion terminating in an open end of the article. A mold surface surrounds the end portion in juxtaposition with its outer surface, and an expandable tubular membrane is received within the end portion in juxtaposition with the inner surface thereof. The interior of the membrane is sealed from the ambient, elongation of the membrane is restricted, and expansion of the membrane is limited to a lateral zone thereof coextensive with the end portion. The outer surface of the end portion is conformed to the mold surface by subjecting the interior of the membrane to a fluid under pressure to expand the membrane laterally in engagement with the inner surface of the end portion.

9 Claims, 6 Drawing Figures

U.S. Patent Oct. 10, 1978 4,119,394
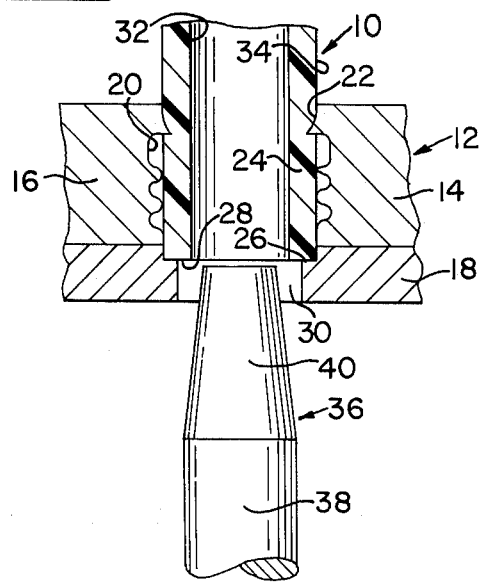
FIG_1 PRIOR ART
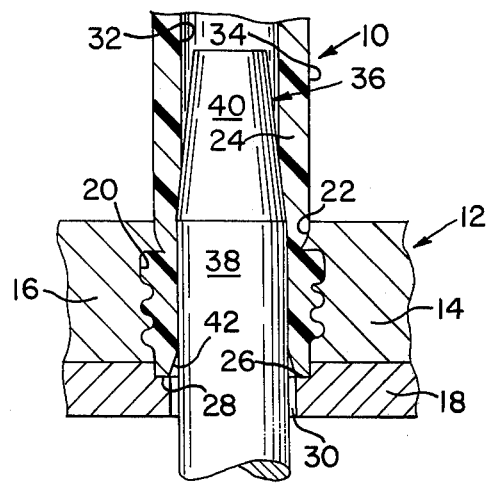
FIG_2 PRIOR ART
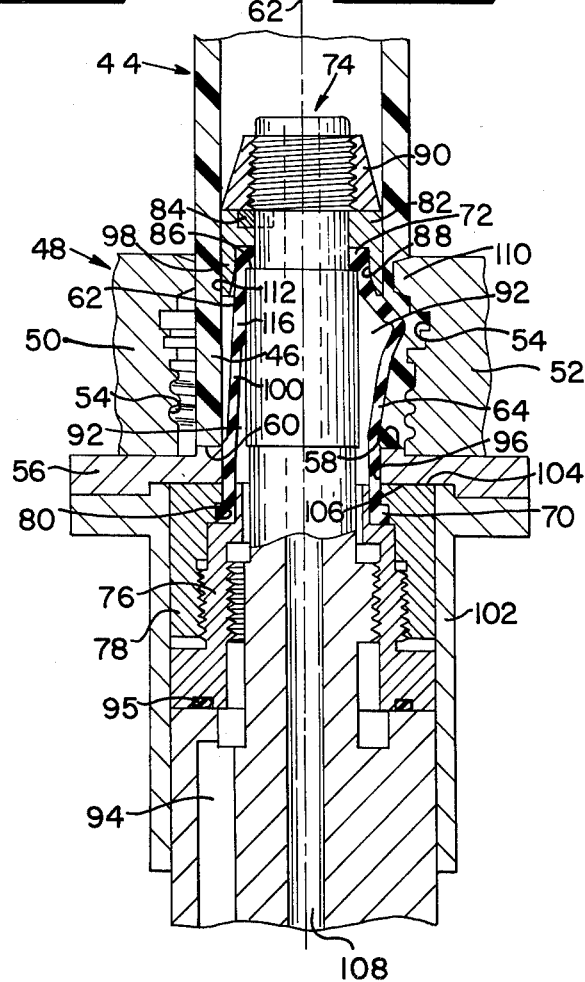
FIG_4A  FIG_4B
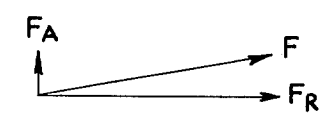
FIG_3
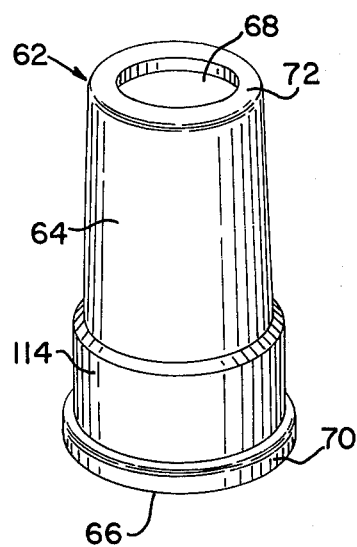
FIG_5

APPARATUS FOR FORMING AN END FINISH ON A HOLLOW ARTICLE

BACKGROUND OF THE INVENTION

This invention relates to apparatus for forming an end finish on a hollow article having a plastically deformable tubular end portion terminating in an open end of the article. The invention also relates to a membrane for use in such apparatus.

Ordinarily in the production of plastic containers of the type which includes bottles and jars, and particularly those intended to be provided with a closure, a so-called end finish or neck finish is formed on the outer surface of the container adjacent to its open end. The configuration of each neck finish is dictated by such considerations as the type and form of the closure selected for the container, sealing requirements, desired ease of handling, compatibility with filling equipment, and the like. In many cases the neck finish must be formed with comparatively great precision in order to meet the criteria imposed by such considerations.

In one system of blow-molding plastic containers, a tubular preform or parison of thermoplastic material is brought to a temperature at which it is plastically deformable and placed in a mold cavity having the configuration of the finished container. The wall of the parison is then subjected to a fluid pressure differential whereby the parison is expanded to conform to the cavity surface. The parison may be one that has been injection-molded with one end closed, or it may be an extruded tube cut to length, one end of which is closed mechanically before the blow-molding operation is performed. In the case of injection-molded parisons, the neck finish can be formed during the injection-molding process, but this adds substantially to the cost of the injection-molding equipment. Further, some materials are subject to significant shrinkage is reheated prior to the blow-molding operation. It is impracticable to form the neck finish on an extruded parison during extrusion. In view of these considerations, the neck finish is frequently formed in the well-known manner illustrated in FIGS. 1 and 2 of the accompanying drawing, usually just prior to expansion of the parison.

More particularly an end portion of a plastically deformable parison 10 is received within a neck mold 12 which comprises mold members 14, 16 and 18. Mold members 14 and 16 are movable to and from the closed position of the mold shown in FIGS. 1 and 2 in which they cooperate to define a neck mold surface 20. Adjacent to the mold surface is a choke ring 22 which partially penetrates the wall 24 of the parison when mold members 14 and 16 are moved to their closed position, as shown. The choke ring must be so configured that it firmly constrains the parison against axial movement in the upward direction as viewed in the drawing. Mold member 18 is provided with an annular shoulder or ledge 26 for engagement with the rim 28 which surrounds the open end of parison 10. Concentric with ledge 26 and surrounded thereby is an aperture 30 extending through mold member 18. Aligned with aperture 30 and adapted to be received therethrough is a swage 36, usually formed of metal and having a cylindrical body 38 and a frustoconical cam end 40. The maximum transverse dimension of the swage is somewhat larger than that of the inner surface 32 of parison 10 but smaller than that of its outer surface 34.

In forming an end finish on parison 10, which end finish will become the neck finish of the container to be blow-molded, swage 36 is moved upwardly from the position shown in FIG. 1 to that shown in FIG. 2. During such movement, the swage cam end 40 acts to force the material of parison wall 24 laterally outwardly to conform outer surface 34 to neck mold surface 20.

The conventional swaging procedure illustrated in FIGS. 1 and 2 is quite satisfactory in many applications. However, when fine precision and rigidly consistent results are called for, it is inadequate, or in some cases wholly unacceptable, for several reasons.

Firstly, when cam end 40 has passed beyond the end portion of the parison; that is, when swage 36 has arrived at the position shown in FIG. 2, and as the end portion begins to cool in the neck mold, its wall may tend to shrink somewhat. If sufficient shrinkage occurs, the compressive forces exerted on the wall by the swage and neck mold surface 20 will be reduced to zero, and the outer surface of the end portion may therefore tend to draw away from neck mold surface 20. While this tendency can be anticipated in designing the neck mold surface, consistent results and precise conformation to neck design are extremely difficult if not impossible to achieve.

Secondly, parison rim 28 and adjacent portions of inner surface 32 are necessarily deformed as the result of frictional forces generated at the interface of the surface of the swage and the inner parison surface. Referring to FIG. 3, these forces are shown as an axial component $F_A$ of the force F applied to the parison wall by cam end 40 of the swage, vector $F_R$ representing the radial or lateral component acting to conform the parison wall to the neck mold surface. While the axial component $F_A$ is present to some degree in all instances, it increases in magnitude as the temperature of the swage rises during continuous use. It also increases as parison materials of higher viscosity are substituted, and it becomes excessive in the case of certain thermoplastics, notably polyethylene terephthalate and the high acrylonitriles (which include acrylonitrile as a major constituent and lesser amounts of styrene and sometimes butadiene). In any event, some of the material of parison wall 24 is drawn with the swage in the axial direction to enlarge or flare the open end of the parison, as shown at 42 in FIG. 2, thereby deforming rim 28 and diminishing its area. As a result, the rim may not cooperate adequately with the container closure, especially if a good seal therebetween is required.

Various expedients intended to alleviate this problem have been attempted heretofore but each has its own deficiencies. Thus, if a lubricant such as a silicon preparation is applied to the surface of the swage, the cost of the lubricant and its applicator must be considered. Further, it has been found that it is difficult to apply a surface lubricant uniformly, and even if only a small area is missed, material at the inner surface of the parison is nevertheless drawn along with the swage. If the container is to be filled with a food, a beverage, a medicinal or therapeutic preparation, or any other substance requiring a sterile or sanitary package, the lubricant becomes a contaminant which must be removed completely before the container is filled, thereby adding to the filler's costs and creating a potential for liability. Similar considerations apply in the case of other means of lubrication, as by impregnating a porous swage with graphite.

If the swage is coated with a material having a low coefficient of friction, graphite or Teflon for example, the coating wears rapidly. Attempts to form the swage entirely of a low-friction material such as Teflon or other synthetic resin have resulted in early plastic deformation of the swage.

Finally, the conventional swaging operation may not be satisfactory in the case of a neck finish which calls for relatively large lateral displacement of the parison material; that is, one which requires a thread, a bead, a flange or the like to be executed in high relief. In such a case, necessary limitations on the dimensions of the swage, parison, and neck mold surface render it difficult or impossible to displace the material of the parison wall sufficiently to conform its outer surface to neck mold surface 20.

SUMMARY OF THE INVENTION

In accordance with the present invention, the swage is omitted. In its stead there is employed an expandable tubular membrane receivable within the end portion of the hollow article to be provided with an end finish. The membrane is supported in juxtaposition with the inner surface of the end portion, and the interior of the membrane is sealed from the ambient so that its interior may be subjected to a fluid under pressure to expand the membrane laterally in engagement with the inner surface of the end portion, whereby to conform the outer surface of the end portion to the mold surface. Elongation of the membrane is restricted and expansion thereof is limited to a lateral zone coextensive with the end portion.

Other objects, features and advantages of the invention will be apparent from the ensuing description in conjunction with the accompanying drawing.

THE DRAWING

In the accompanying drawing:

FIGS. 1 and 2 are partial longitudinal sectional views of well-known apparatus illustrating the conventional swaging procedure heretofore described;

FIG. 3 is a force diagram associated with FIGS. 1 and 2;

FIG. 4 is a partial longitudinal sectional view of apparatus constructed in accordance with the invention and of a parison associated with the apparatus, FIG. 4A representing that portion of the apparatus at one side of the longitudinal axis thereof and showing a membrane element thereof in a first condition, FIG. 4B representing that portion of the apparatus at the other side of the longitudinal axis thereof with the membrane element in a second condition; and FIG. 5 is a perspective view of the membrane element removed from the apparatus of FIG. 4.

THE ILLUSTRATED EMBODIMENT

Referring particularly to FIG. 4, there is shown a tubular parison 44 of thermoplastic material having an end wall portion 46 terminating in an open end of the parison, the end wall portion being received within a neck mold 48. The neck mold is similar in construction and operation to mold 12 illustrated in FIGS. 1 and 2 and described hereinabove. More particularly, neck mold 48 comprises first and second mold members 50 and 52 having inner surfaces which, when the mold is closed, cooperate to define a generally annular mold surface 54 adapted to surround the end wall portion of the parison and having a configuration corresponding to the desired neck finish of a container to be formed from the parison. A third mold member 56 is provided with a second mold surface 58 in the form of a planar annulus concentric with mold surface 54 and adapted to be engaged by a rim portion 60 of parison 44 surrounding the open end thereof.

Mold members 50 and 52 are partible in a plane which is normal to the plane of the drawing and which includes the longitudinal axis 62 common to the parison and to the apparatus of the invention, the apparatus being generally radially symmetrical about axis 62. Mold members 50 and 52 abuttingly engage mold member 56 for sliding movement relative thereto to and from the closed position. While such movement of mold members 50 and 52 is preferably synchronous in practice, for purposes of illustration mold member 50 is shown in an open position while mold member 52 is shown in the closed position.

Received within end portion 46 of the parison is an expandable tubular membrane 62 formed of an elastomeric material. A suitable material for this purpose is commercially available from Chicago-Allis Mfg. Corp. of Chicago and is identified as Compound B-437-A by that firm. The membrane is formed with a side wall 64 of generally tapered or frustoconical form having a maximum diameter smaller than the inner diameter of parison 44 to facilitate reception of the membrane within the parison, an open base end 66, and an open upper end 68 (FIG. 5). For purposes to be explained hereinafter, the membrane is provided with an annular lower bead 70 extending radially outwardly of the side wall and an annular upper bead 72 extending radially inwardly of the side wall.

The membrane is supported in juxtaposition with the inner surface of parison end portion 46 by means of a post member 74, the membrane being carried by the post member laterally outwardly thereof. To secure base end 66 of the membrane to the post member, a lower pair of annular retaining elements is provided, namely an inner adapter 76 threadedly mounted on a lower portion of the post member, and an outer retainer 78 threadedly mounted on the adapter. Adapter 76 and retainer 78 cooperate to define an annular recess 80 in which is received lower bead 70 of the membrane, the recess being so dimensioned that the bead is compressed by the retaining elements.

Similarly, upper end 68 of the membrane is secured to the post member by an upper pair of annular retaining elements. An outer one of the latter, in the form of an inner choke ring 82, is carried on an upper portion of the post member and is prevented from rotating relative thereto by a key 84, whereby twisting of the membrane is avoided during assembly thereof with the post member. Inner choke ring 82 cooperates with a shoulder 86, which is formed on the post member and which comprises an inner one of the upper retaining elements, to define an annular recess 88 within which upper bead 72 of the membrane is received. A tapered of frustoconical nut member 90 is threadedly received on the post member at the upper end thereof and engages inner choke ring 82. Recess 88 is so dimensioned that upper bead 72 is compressed between inner choke ring 82 and shoulder 86.

It will be apparent that with the construction just described, the membrane is constrained against elongation, and because the lower and upper beads 70 and 72 of the membrane are compressed to the pedetermined extent necessary to secure the membrane to the post member in fluid-tight relationship, the interior of the membrane is sealed from the ambient.

Membrane 62 and post member 74 thus cooperate to define an annular chamber 92 surrounded by the membrane. A fluid passage 94, formed in the post member and defined in part by adapter 76, communicates with chamber 92 to admit fluid under pressure to the chamber. An O-ring 95 is provided between post member 74 and adapter 76 to prevent the escape of fluid from passage 94.

An aperture extending through mold member 56 and defined by an inner annular wall 96 thereof is adapted to receive the membrane and post member therethrough. It will be noted that retainer 78 and wall 96 constrain a lower portion of the membrane against expansion, while a skirt 98 depending from inner choke ring 82 performs a similar function with regard to an upper portion of the membrane, whereby expansion of the membrane is limited to a lateral zone 100 thereof coextensive with parison end portion 46.

Affixed to the underside of mold member 56 by any suitable means (not shown) is a guide bushing 102 in which post member is slidingly reciprocatable. Stop means 104 and 106 are provided on the post member and mold member 56, respectively, to limit the extent to which the post member and membrane are received within the parison end portion, the stop means thereby acting to position the membrane in juxtaposition with the inner surface of the end portion.

If the finished container is to be blow-molded immediately after the end finish is formed, the post member may be provided with a blow tube 108 to admit a blowing gas under pressure to the interior of parison 44.

An outer choke ring 110 is formed on mold 48 adjacent to neck mold surface 54 and extends radially inwardly thereof, and a mandrel surface 112 is provided on skirt 98 of inner choke ring 82, the outer choke ring and mandrel surface cooperating to constrict end wall portion 46 therebetween when mold members 50 and 52 are moved to the closed position and the post member is received within the end portion. Such constriction acts to preclude extrusion of membrane 62 between the inner surface of end wall portion 46 and the post member when the membrane is expanded. This is especially useful in the case of those synthetic resins, polypropylene for example, which are displaced with relatively little force due to their low viscosity in the plastically deformable state. However, the dimensions of outer choke ring 110 may be reduced in many applications, for example in the use of parisons formed of polyethylene terephthalate or the high acrylonitriles.

Side wall 64 of the membrane may be provided with a thickened portion 114 outwardly thereof adjacent to lower bead 70 if the lower portion of the exterior of the membrane is to be subject to abrasion, as might arise, for example, from engagement with inner wall 96 of mold member 56. Similarly, side wall 64 may be provided with a thickened portion 116 inwardly thereof, in this instance adjacent to upper bead 72, if a portion of mold surface 54 is so configured that the corresponding portion of the membrane will be subject to a high degree of flexure during operation. Here again, thickened portions 114 and 116 may be omitted in many applications of the invention.

OPERATION

Again referring particularly to FIG. 4, the preferred method of operation of the illustrated apparatus will be described.

Before parison 44 is received in the apparatus, mold members 50 and 52 are situated in an open position; that is, both are positioned at equal radial distances from axis 62 at least equivalent to the radial distance therefrom shown for mold member 50 in FIG. 4A. Post member 74 and membrane 62 carried thereby are positioned somewhat lower than they are shown in the drawing; specifically, they are in a position such that mandrel surface 112 is slightly below outer choke ring 110. Thus, at this point, stop means 104 and 106 are disengaged and spaced from one another vertically. The fluid pressure in chamber 92 is equal to the ambient pressure, whereby sidewall 64 of the membrane is in the relaxed condition depicted in FIG. 4A.

Parison 44 is brought to a temperature at which it is plastically deformable, and its end wall portion 46 is received between mold members 50 and 52 with parison rim portion 60 in engagement with mold surface 58. It will be apparent that, at the same time, post member 74 and membrane 62 will be received within the parison, thus being facilitated by the tapered form of the membrane and of the nut member 90.

Mold members 50 and 52 are now moved radially inwardly toward axis 62 to their closed position, as represented by mold member 52 in FIG. 4B. Mold surface 54 now surrounds end wall portion 46 of the parison in juxtaposition with the outer surface thereof. As mold members 50 and 52 are moved to the closed position, outer choke ring 110 displaces an annular portion of the parison wall radially inwardly at a location adjacent to end wall portion 46.

Post member 74 is now moved upwardly, until stop means 104 and 106 engage one another, to juxtapose the membrane with the inner surface of end wall portion 46. As post member 74 so moves, mandrel surface 112 acts in cooperation with outer choke ring 110 to swage a constriction in the parison wall at the aforesaid location adjacent to end wall portion 46.

In the use of certain materials, polyethylene terephthalate for example, such movement of the post member and membrane may be omitted; that is, before the parison is received in the apparatus, the post member and membrane may be in the axial positions shown in FIG. 4 with stop members 104 and 106 engaged. Such materials do not require the relatively narrow constriction of the parison wall shown in FIG. 4, and the constriction can be formed simply by closing the outer choke ring about the parison against the resistance of mandrel surface 112.

In any event, the interior of the membrane is now subjected to a fluid under pressure (not shown) by way of chamber 92 and passage 94. For purposes of this specification, the term "fluid under pressure" is intended to mean a fluid at a pressure greater than ambient pressure. The fluid is preferably a liquid of the class suitable for use in hydraulically actuated devices. Chamber 92 is filled with such fluid by way of passage 94 at the beginning of operation of the apparatus of the invention, and remains filled with the fluid throughout continuous operation. Now, however, the pressure of the fluid within chamber 92 is raised above the ambient pressure by any suitable means, such as an intensifier (not shown) in communication with passage 94. The intensifier is preferably of a type able to maintain a predetermined and constant pressure on the fluid while altering volume as necessary to accommodate varying parison wall thicknesses, varying lateral displacement requirements, and shrinkage of the parison wall during cooling. The intensifier should also be of a type providing a fixed maximum volume of fluid so that, should the membrane rupture for any reason during use, fluid losses and the resulting contamination of the apparatus will be limited.

When the interior of the member is subjected to the fluid under pressure, the membrane, or more particularly, zone 100 thereof coextensive with end wall portion 46, will be expanded laterally in engagement with the inner surface of the end wall portion, whereby to conform the outer surface of the end wall portion to mold surface 54, as depicted in FIG. 4B. The pressure is maintained until the end wall portion of the parison has cooled sufficiently in mold 48 that no further shrinkage of any significant proportion will occur.

The pressure in chamber 92 is now relieved to relax the membrane and thus return it to the condition shown in FIG. 4A, whereupon mold members 50 and 52 are moved radially away from axis 62 to an open position clear of parison 44. Simultaneously post member 74 is retracted to a position in which its uppermost surface is below mold surface 60 so that the parison can be readily removed from the apparatus.

Normally, however, during or after the neck finish forming operation, but before mold 48 is opened and post member 74 retracted, a container will be blow-molded from parison 44 in well-known manner by employing a blow-mold immediately superjacent to mold 48 and by admitting a blowing gas under pressure to the interior of parison 44 by way of blow tube 108.

It will be readily apparent from the foregoing description that use of the invention provides a number of advantages relative to the swaging procedure illustrated in FIGS. 1 and 2 and heretofore described. Among the chief advantages are the following.

The pressure differential acting on the wall of membrane 62 can be maintained until the end wall portion of the parison has cooled to the extent that no further shrinkage of any significance will take place.

The membrane generates no frictional forces on the inner surface of the parison in the axial direction, and therefore the outer surface of the membrane need not be lubricated.

The membrane can be expanded, within relatively wide limits, to the extent necessary to form features of the neck finish in high relief.

In the known swaging procedure, swage 36 (FIGS. 1 and 2) cannot be moved upwardly in engagement with the parison until mold members 14 and 16 have been moved to their closed position, and even then it forms the end finish progressively. In the case of one end finish, the known procedure has required three seconds, whereas when the present invention was employed, less than one-half second was required to form the same end finish.

In the known swaging procedure, the cross-sectional form of choke ring 22, dictated by the need to constrain the parison firmly against axial movement in the upward direction, gives rise to stress concentrations which substantially weaken the wall of the container. Further, a choke ring so configured requires a parison having a comparatively large minimum wall thickness, thereby adding to the weight of material required and the weight of the finished container. In the present invention, the cross-sectional form of the choke ring may be selected to eliminate sharp stress concentrations, as is demonstrated by the form of outer choke ring 110 represented in FIG. 4, and in the case of certain parison materials, the dimensions of the outer choke ring can be reduced substantially.

Finally, the membrane can be operated over a wide range of neck finish dimensions, whereas the swage of the known apparatus must be machined precisely for each application.

While the invention has been particularly described in connection with a certain specific embodiment thereof, it is to be understood that this is by way of illustration and not of limitation, and that the scope of the appended claims should be construed as broadly as the prior art will permit.

What is claimed is:

1. Apparatus for forming an end finish on a hollow article having a plastically deformable tubular end portion terminating in an open end of the article, the apparatus comprising a mold surface adapted to surround the end portion in juxtaposition with the outer surface thereof, an expandable tubular membrane having an upper end and a base end, said upper end being receivable within the end portion, means supporting the membrane in juxtaposition with the inner surface of the end portion, means sealing the interior of the membrane from the ambient, means restricting elongation of the membrane, means limiting expansion of the membrane to a lateral zone thereof coextensive with the end portion, means communicating with the interior of the membrane for subjecting the interior of the membrane to a fluid under pressure to expand the membrane laterally in engagement with the inner surface of the end portion, whereby to conform the outer surface of the end portion to the mold surface, choke means adjacent to the mold surface and extending inwardly thereof, mandrel means carried by the supporting means and adapted to engage the inner surface of the wall of the article opposite the choke means when the membrane is in juxtaposition with the inner surface of the end portion, the mandrel means and the choke means cooperating to constrict the wall of the article therebetween at a location adjacent to the end portion and opposite the open end of the article when the membrane is received within the end portion and the end portion is surrounded by the mold surface, whereby to preclude extrusion of the membrane between the wall of the article and the supporting means when the membrane is expanded and a third mold member adjacent the exterior of said mold surface having an inner wall position to engage said membrane and a further mold surface positioned to engage the rim portion of the article to substantially preclude expansion of the base end of said membrane.

2. Apparatus according to claim 1, wherein the means for subjecting the interior of the membrane to a fluid under pressure includes a chamber defined by the membrane in cooperation with the supporting means and surrounded by the membrane, and fluid passage means provided in the supporting means and communicating with the chamber for admitting the fluid under pressure thereto.

3. Apparatus according to claim 1, including a mold comprising first and second mold members movable to and from a closed position enclosing the end portion of the article, the first and second mold members cooperating in the closed position to provide the mold surface and the choke means inwardly of the first and second mold members.

4. Apparatus according to claim 3, wherein the first and second mold members abuttingly engage the third mold member for sliding movement relative thereto to and from the closed position.

5. Apparatus according to claim 4, wherein the third mold member includes means defining an aperture therethrough surrounded by the second mold surface at a first side of the third mold member, the post means and the membrane being adapted to extend through the aperture to be received in the end portion.

6. Apparatus according to claim 5, including stop means on the post means and on a second side of the third mold member opposite the first side thereof, the stop means cooperating to limit the extent to which the post means and membrane are received within the end portion and thereby position the membrane in juxtaposition with the inner surface of the end portion.

7. Apparatus for providing an end finish on a hollow article formed of thermoplastic material and having a cylindrical end wall portion in a plastically deformable state which terminates in an open end of the article, the apparatus comprising an annular mold surface adapted to surround the end wall portion in juxtaposition with the outer surface thereof, an expandable tubular membrane having an upper end and a base end at opposite ends thereof, post means receivable within the article supporting the membrane in juxtaposition with the inner surface of the end wall portion, the membrane being carried by the post means laterally outwardly thereof, means securing the membrane to the post means in fluidtight relationship at said opposite ends of the membrane, the membrane-securing means constraining the membrane against elongation, the membrane and the post means cooperating to define an annular chamber surrounded by the membrane, the membrane-securing means cooperating with the membrane to seal the chamber from the ambient, means limiting expansion of the membrane to an annular lateral zone thereof coextensive with the end wall portion, means communicating with the annular chamber for admitting fluid under pressure to the chamber to expand the membrane laterally in engagement with the inner surface of the end wall portion, whereby to conform the outer surface of the end wall portion to the annular mold surface, an outer choke ring adjacent to the mold surface and extending radially inwardly thereof, an inner choke ring carried by the post means at an end thereof and adjacent to the upper end of the membrane, the inner choke ring being provided with a mandrel surface adapted to engage the inner surface of the wall of the article opposite the outer choke ring when the membrane is in juxtaposition with the inner surface of the end wall portion, the inner and outer choke rings cooperating to constrict the wall of the article therebetween at a location adjacent to the end wall portion and opposite the open end of the article when the post means is received within the article and the end wall portion is surrounded by the mold surface whereby to preclude extrusion of the membrane between the wall of the article and the post means when the membrane is expanded and a third mold member adjacent the exterior of said mold surface having an inner wall positioned to engage said membrane and a further mold surface positioned to engage the rim portion of the article to substantially preclude expansion of the base end of said membrane.

8. Apparatus according to claim 7, wherein the membrane is formed of an elastomeric material and comprises a tubular side wall open at opposite ends thereof, a first annular bead at one of said ends extending radially outwardly of the side wall, and a second annular bead at the other of said ends extending radially inwardly of the side wall, the membrane-securing means comprising a first pair of annular retaining elements on the post member adapted to receive and adjustably compress the first annular bead therebetween, one of the first pair of retaining elements comprising the inner choke ring, and a second pair of annular retaining elements on the post member adapted to receive and adjustably compress the second annular bead therebetween.

9. Apparatus according to claim 8, wherein the membrane side wall is of generally frustoconical form tapering from said one end thereof to said other end thereof.

* * * * *